United States Patent
Werner et al.

(10) Patent No.: US 8,032,563 B2
(45) Date of Patent: Oct. 4, 2011

(54) GENERATING A UNIQUE REPRESENTATION OF PHYSICAL ASSETS

(75) Inventors: Thomas Werner, Baden (CH); Claus Vetter, Buchs (CH); Lorenzo Gulli, Espoo (FI); Erik Svensson, Zurich (CH); Tatjana Kostic, Niederrohrdorf (CH)

(73) Assignee: ABB Research Ltd, Zurich (CH)

( * ) Notice: Subject to any disclaimer, the term of this patent is extended or adjusted under 35 U.S.C. 154(b) by 802 days.

(21) Appl. No.: 11/938,077

(22) Filed: Nov. 9, 2007

(65) Prior Publication Data
US 2008/0140609 A1 Jun. 12, 2008

Related U.S. Application Data (63) Continuation of application No. PCT/CH2005/000269, filed on May 13, 2005.

(51) Int. Cl.
*G06F 17/30* (2006.01)
(52) U.S. Cl. ...................................... 707/803
(58) Field of Classification Search .................. 707/625, 707/763, 799, 803, E17.125
See application file for complete search history.

(56) References Cited

U.S. PATENT DOCUMENTS

| | | | |
|---|---|---|---|
| 5,504,890 A | | 4/1996 | Sanford |
| 6,418,400 B1 * | | 7/2002 | Webber ............................ 703/22 |
| 6,535,892 B1 * | | 3/2003 | LaRue et al. ...................... 1/1 |
| 6,708,163 B1 | | 3/2004 | Kargupta et al. |
| 7,490,112 B1 * | | 2/2009 | Suresh et al. ........................ 1/1 |
| 2002/0083102 A1 * | | 6/2002 | Vetter et al. .................... 707/530 |
| 2002/0184065 A1 * | | 12/2002 | Menard et al. ...................... 705/7 |
| 2004/0236620 A1 * | | 11/2004 | Chauhan et al. ................... 705/9 |
| 2005/0092825 A1 * | | 5/2005 | Cox et al. ....................... 235/375 |

FOREIGN PATENT DOCUMENTS

| | | |
|---|---|---|
| WO | WO 99/24925 (A2) | 5/1999 |
| WO | WO2005088472 A1 * | 9/2005 |

OTHER PUBLICATIONS

Svensson et al, Data Consistency in a Heterogeneous It Landscape: A Service Oriented Architecture Approach, 2004 IEEE, pp. 3-8.*
Allamagny et al, Information Model for capacity Management in Global Telecommunication Networks, 1994 Plenum, pp. 29-48.*
Thomas Werner et al., Optimizing Asset Usage Through Intergrated maintenance Software System, 2003 IEEE, pp. 430-435.*
Vetter et al., From Order to Production: a distinct View on Integration of Plaant Floor and Business Sytem, 2003 IEEE, pp. 276-281.*

(Continued)

*Primary Examiner* — Fred I Ehichioya
(74) *Attorney, Agent, or Firm* — Buchanan Ingersoll & Rooney PC (57) ABSTRACT

The present disclosure is concerned with generating a unique representation of a physical asset from a plurality of datasets representing information relating to the physical asset. Each dataset is generated by a system that acquires the dataset in a system-specific format. Each dataset that includes information about the attributes of a physical asset is mapped to a corresponding system-specific global dataset, based on a global data model. The global system-specific datasets generated are merged together to generate a global dataset, based on the global data model. The global dataset therefore uniquely represents the physical asset.

6 Claims, 4 Drawing Sheets

OTHER PUBLICATIONS

*Form PCT/ISA/210 (International Search Report) dated Sep. 5, 2005.
* Form PCT/ISA/237 (Written Opinion of the International Searching Authority) dated Sep. 5, 2005.
* Form PCT/IPE/V409 (International Preliminary Report on Patentability) dated Oct. 5, 2007.
* Erik Svensson et al., "Data Consistency in a Heterogeneous It Landscape: A Service Oriented Architecture Approach", Proceedings of the 8th IEEE Intl Enterprise Distributed Object Computing Conference, Sep. 20-24, 2004, pp. 3-8, XP-010730208 (cited in International Search Report, Written Opinion and IPER).
*T. Kostic, "Asset Management in Electrical Utilities: How Many Facets It Actually Has", IEEE Power Engineering Society General Meeting, Conference Proceedings, Jul. 13-17, 2003, vol. 4 of 4, pp. 275-281 (cited in International Search Report).

* cited by examiner

*transformerGlobal.xsd*

```
<xs:element name="transformer">
 <xs:complexType>
  <xs:sequence>
   <xs:element name="TransformerID" type="xs:string" rule="CMMS"/>
   <xs:element name="VL" type="xs:string" priority/>
   <xs:element name="Operational" type="xs:string" rule="CMMS"/>
   <xs:element name="OilType" type="xs:string" rule="http://myAmbiguityService.com/OilType"
   SCADA.<OilType>,CMMS.<OT> />
  </xs:sequence>
  ...
 </xs:complexType>
</xs:element>
```

*transformerSCADA.xsd*

```
<xs:element name="transformer">
 <xs:complexType>
  <xs:sequence>

<xs:element name="VoltageLevel" type="xs:string"
priority=1 />
<xs:element name="TransID" type="xs:string" />
<xs:element name="optl" type="xs:string" />
<xs:element name="OilType" type="xs:string" />
...
 </xs:complexType>
</xs:element>
```

506

*transformerCMMS.xsd*

```
<xs:element name="transformer">
 <xs:complexType>
  <xs:sequence>
   <xs:element name="VoltageLevel" type="xs:string"
   priority=3 />
   <xs:element name="ID" type="xs:string" />
   <xs:element name="OT" type="xs:string" />
   ...
  </xs:complexType>
 </xs:element>
```

FIG. 6

| transformerSCADA.xml | transformerCMMS.xml |
|---|---|
| `<?xml version="1.0" encoding="UTF-8"?>`<br>`<transformer ... omitted>`<br>`<App>SCADA</App>`<br>`<TransID>000001000021ID</TransID>`<br>`<VoltageLevel>380</VoltageLevel>`<br>`<Operational>True</Operational>`<br>`...`<br>`</transformer>` | `<?xml version="1.0" encoding="UTF-8"?>`<br>`<transformer ... omitted>`<br>`<App>CMMS</App>`<br>`<ID>0CDE01PX0021</ID>`<br>`<OT>Unknown</OT>`<br>`<Operational>False</Operational>`<br>`...`<br>`</transformer>` |

| transformerSCADA.xml (mapped) | transformerCMMS.xml (mapped) |
|---|---|
| `<?xml version="1.0" encoding="UTF-8"?>`<br>`<transformer ... omitted>`<br>`<TransformerID>000001000021ID</TransformerID>`<br>`<VL>380</VL>`<br>`<Operational>True</Operational>`<br>`<OilType></OilType>`<br>`...`<br>`</transformer>` | `<?xml version="1.0" encoding="UTF-8"?>`<br>`<transformer ... omitted>`<br>`<TransformerID>0CDE01PX0021</TransformerID>`<br>`<VL></VL>`<br>`<Operational>False</Operational>`<br>`<OilType>Unknown</OilType>`<br>`...`<br>`</transformer>` |

704     706

GENERATING A UNIQUE REPRESENTATION OF PHYSICAL ASSETS

RELATED APPLICATIONS

This application claims priority as a continuation application under 35 U.S.C. §120 to PCT/CH2005/000269 filed as an International Application on 13 May 2005 designating the U.S., the entire contents of which are hereby incorporated by reference in their entireties.

TECHNICAL FIELD

The disclosure relates to the field of industrial Information Technology (IT) as utilized in particular in process or utility automation. It departs from a method of generating a unique representation of a physical asset from a plurality of local or system-specific representations of the physical asset.

BACKGROUND INFORMATION

Power utilities are concerned with the generation, transmission and distribution of electrical power. The physical assets or devices used in power utilities have specific properties associated with them. Examples of such physical assets include stations, lines, transformers or breakers. The properties include, for instance, a nominal primary voltage or a momentary tap position of a transformer. For maintaining, operating, controlling and/or monitoring these physical assets, various local applications or supervisory systems are employed. The term "local" in the context of the present disclosure does not relate to a geographical property, but refers to the fact that these applications or systems are concerned only with certain aspects of the physical assets and may refer to the same physical asset in a number of different ways.

Typically, supervisory systems are employed for monitoring and controlling the physical assets from a central location, and to that purpose acquire specific properties of the physical assets. The physical assets are represented or modeled in the various local applications or supervisory systems as software objects with attributes related to the specific properties of the physical asset.

In the field of power utility automation, examples of such supervisory systems include a Computerized Maintenance Management System (CMMS), a Supervisory Control And Data Acquisition (SCADA) System, a Geographic Information System (GIS), an Enterprise Resource Planning (ERP) Tool and the like. The difference in representation is due to the fact that each system is responsible for different aspects of managing the physical asset. As a result, a physical asset can be identified in different ways by each system. For instance, a CMMS may consider a physical asset such as a transformer to be an asset that has to be maintained, while a SCADA system considers the transformer to be an asset that has to be operated and monitored. Such systems therefore operate on heterogeneous datasets that are not coherent, and their respective representations can therefore be in conflict with each other. Moreover, consolidated access to the various representations acquired by respective systems is cumbersome.

In addition, each of the supervisory systems mentioned allows to modify the underlying data sets, both for an initial setup and continuous updates, i.e. attributes can be changed at runtime, either automatically or initiated through operators and utility personnel. Such modifications on the system side reflect the frequent modifications of e.g. the electrical network of a power utility through commissioning or disposal of physical assets, which subsequently imply changes in one or more of the local application's data sets. The foregoing may result in inconsistent data, e.g. an attribute having different values in the control and maintenance system.

In the U.S. Pat. No. 5,504,890 a system is provided for sharing data among independent data-gathering contributors. Each contributor maintains a database with information pertaining to monitored entities and arranged in data fields. A monitored-entity specific subset of data fields is identified which contains information about the monitored entity that is associated with several of the contributors. Viewing prioritization rule sets are derived which automatically resolve conflicts between information in said monitored-entity subset of data fields. Each viewing prioritization rule set is associated with a particular contributor and is referred to whenever the latter originates the view request or a search query.

SUMMARY

It is therefore an objective of the disclosure to generate a unique representation of a physical asset from a plurality of system-specific datasets associated with representations of the physical asset in a plurality of systems or local applications. This objective is achieved by a method of, and an arrangement or computer program for, generating a unique representation Each system-specific dataset represents the physical asset in a system-specific data format, i.e. based on a system-specific or local data model. It includes system-specific information pertaining to the physical asset. The present method includes mapping each system-specific dataset into a global system-specific dataset, based on a common or global data model. The global data model is a standard format according to which the mapping takes place. Thereafter, the method includes merging each of the global system-specific datasets into a global dataset, based on the global data model, wherein the global dataset uniquely or unambiguously represents the physical asset and includes information related to the physical asset from the plurality of systems. The merging is based on a set of rules that assist in resolving any conflict in representations of the physical asset.

The disclosure further provides an arrangement for generating the unique representation of the physical asset from the plurality of system-specific datasets. The system includes a means for mapping each of the system-specific datasets into a corresponding global system-specific dataset, based on the global data model; and a means for merging each of the global system-specific datasets into one global dataset, based on the global data model.

In other words, each local data representation of one particular physical asset is mapped into a global dataset based on a global data model. Once a consistent and comparable data set representation is available, mapped local data representations can be merged together to shape a single global representation of the particular physical asset. Conflicts that could occur during the step of merging are resolved by defining a set of conflict resolution rules, the structure, syntax, and semantic of which can be agreed upon on a case-by-case base according to the specific synchronization needs of the local applications.

In an advantageous variant of the disclosure, the set of rules determine which data or attribute of at least two conflicting mapped local data representations is retained for the single global representation of the particular physical asset. This can be done by means of a logic function, or by means of a running service for conflict resolution that is provided with the at least two conflicting mapped local data representations.

The present disclosure is particularly useful for power utilities, where attributes can be changed at runtime, either automatically or initiated through utility personnel, reflecting the frequent modifications of the electrical network of the power utility. Hence, changes in one or more of the system-specific data sets may result in inconsistent data, e.g. an attribute having different values in the control and maintenance system, and thus in a situation that calls for an update of the global representation. By way of example, the global data model in the case of power utilities is the Common Information Model (CIM) according to the standard IEC 61970.

BRIEF DESCRIPTION OF THE DRAWINGS

The subject matter of the disclosure will be explained in more detail in the following text, with reference to preferred exemplary embodiments illustrated in the attached drawings, of which.

The reference symbols used in the drawings, and their meanings, are listed in summary form in the list of reference symbols. In principle, identical parts are provided with the same reference symbols in the figures

DETAILED DESCRIPTION

The present disclosure relates to the generation of a unique representation of a physical asset or device from a plurality of representations describing the physical asset. The plurality of representations is generated from multiple systems or local applications that supervise or otherwise involve the physical asset. The embodiments of the disclosure create a uniform, coherent, global representation of the physical asset, based on the merging of the single local representations used by the various systems.

The information generated from each system, herein after referred to as a system-specific dataset, is represented in a manner that is specific to the system. Each system acquires information about the physical asset, based on respective system functionalities. Typically, such systems allow physical assets in different locations to be monitored and controlled from a central location. The unique representation of a physical asset is used to achieve consolidated access to the information collected by various systems supervising the physical asset.

Figure 1:
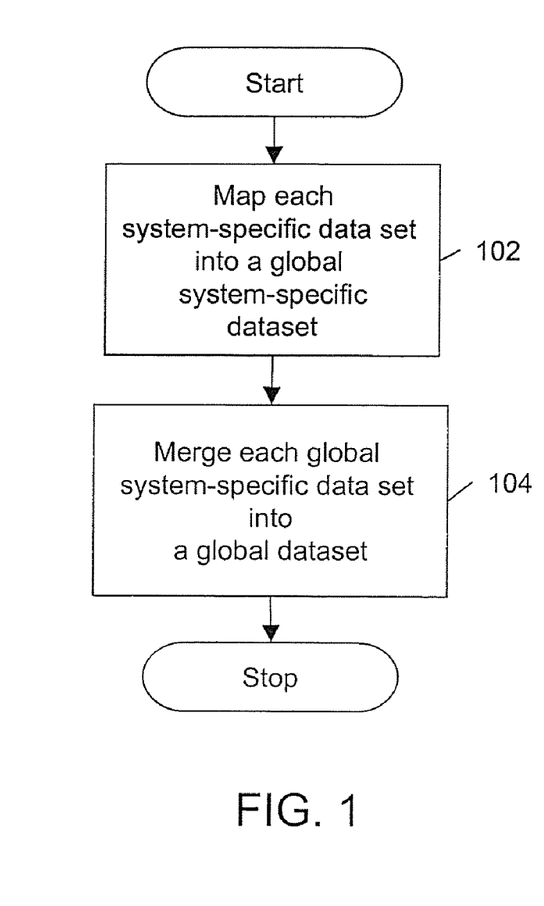
FIG. 1 is a flow chart of a method used for generating a global dataset.

FIG. 1 is a flow chart of a method used for generating a unique representation of a physical asset, according to an embodiment of the disclosure. Exemplary physical assets include, but are not limited to, stations, lines, transformers, breakers and the like. In various embodiments of the disclosure, the physical asset represented may be used in utility operations such as generation, transmission and distribution of power.

For example, a transformer is a physical asset that may be represented in various ways, depending on the type of system that is used to obtain the information. The difference in representation between systems is based on the different aspects of managing the physical asset. For instance, a SCADA system considers the transformer as a device to be operated and monitored, whereas a CMMS system considers the transformer as a physical asset to be maintained. Accordingly, each representation of the physical asset is in a system-specific format based on a system-specific data model.

At step 102, each system-specific dataset that includes information about the attributes of the physical asset is mapped to a corresponding global system-specific dataset, based on a global data model. This mapping is performed since each of the system-specific datasets may have different structures, which cannot be compared or merged. In various embodiments of the disclosure, the mapping, according to the global data model, may be enabled by, for example, an Extensible Stylesheets Language Transformation (XSLT) transformation.

In various exemplary embodiments of the disclosure, the global data model is a standardized format for storing mapped data of a system-specific dataset in data fields of a global system-specific dataset. For instance, the global data model may prescribe a predefined number of attributes for generating a unique representation of a physical asset. Accordingly, each global system-specific data set may include a standard set of attributes, by means of which the unique representation may be generated. The standard set of attributes may be arranged in a particular order, enabling a uniform structure to be maintained across the global system-specific data sets. Such a uniform structure also allows comparisons to be made between them.

In another exemplary embodiment of the disclosure, the standardized format may include a template that enables the inputting of data in a particular order, based on, for example, the relevance of the attributes describing the physical asset.

In yet another exemplary embodiment of the disclosure, the global data model enables the mapped global system-specific datasets to be in a text markup language. The text markup language may be in, for example, an eXtensible Markup Language (XML) format.

At step 104, the global system-specific datasets generated are merged together to generate a global dataset, based on the global data model. The global dataset therefore uniquely represents the physical asset. In various embodiments, merging is performed by using a set of rules. In an exemplary embodiment of the disclosure, the set of rules are defined to solve inconsistent values between different system-specific datasets describing a particular attribute of a physical asset. For example, if a system A has acquired an attribute such as a power rating of an adaptor, while a system B has acquired a different power rating for the same adaptor, a set of rules may be defined to select one of the power ratings.

In another exemplary embodiment of the disclosure, the set of rules may include, for example, the selection of predetermined data from among the global system-specific datasets. In an exemplary embodiment of the disclosure, the structure, syntax and semantic of the set of rules can be defined on a case-by-case basis. In another exemplary embodiment of the disclosure, the predetermined data may be selected on the basis of a logic function. For example, each global system-specific dataset may include a customized attribute such as a priority number associated with it that specifies the importance of a particular attribute.

The method of merging the global system-specific datasets is described in detail with reference to FIG. 2 and FIG. 3.

Figure 2:
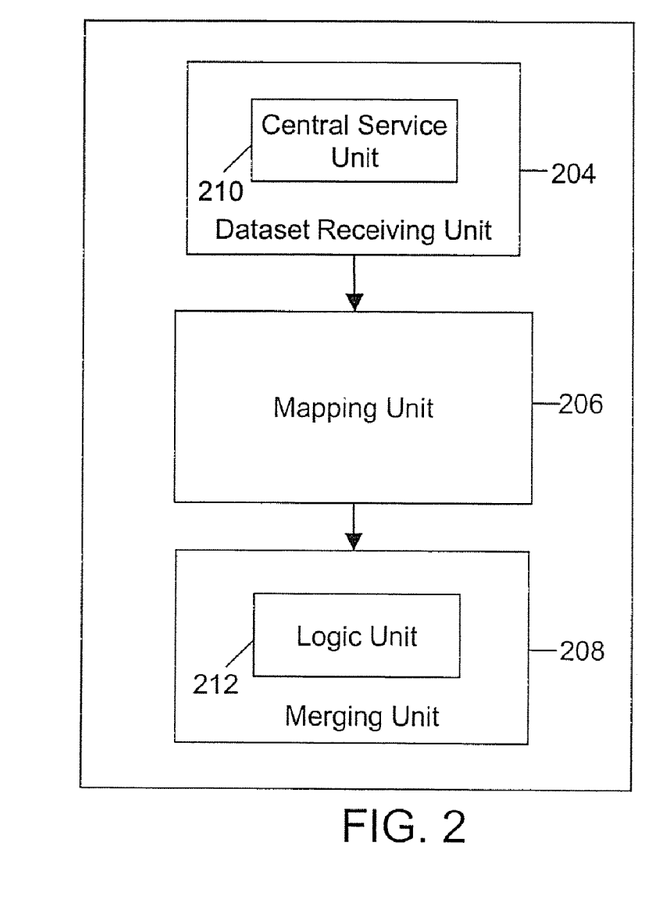
FIG. 2 is a block diagram illustrating elements of an arrangement for generating a global dataset.

FIG. 2 is a block diagram showing the elements of a arrangement 202 for generating the global dataset according to an exemplary embodiment of the disclosure. System 202 includes a dataset receiving unit 204, a mapping unit 206, and a merging unit 208. In various exemplary embodiments of the disclosure, dataset receiving unit 204 further includes a central service unit 210. In accordance with another exemplary embodiment of the disclosure, merging unit 208 further includes a logic unit 212. In various exemplary embodiments of the disclosure, elements of system 202 can be implemented in the form of software modules.

In various exemplary embodiments of the disclosure, dataset receiving unit 204 acquires system-specific datasets from each system. The datasets may be received or collected in the form of a collective dataset that includes data obtained from the various systems supervising the physical asset. The collective dataset is explained in detail with reference to FIG. 4.

In various exemplary embodiments of the disclosure, central service unit 210 provides support to dataset receiving unit 204, to acquire system-specific datasets from the respective systems. Central service unit 210 may, for example, associate data in the collective dataset with the corresponding system-specific dataset. Central service unit 210 may associate instances of local representation to its type and identify the mapping to the global system-specific dataset. Accordingly, central service unit 210 facilitates the generation and mapping of system-specific datasets. The working of central service unit 210 is explained in detail with reference to FIG. 3. The collective dataset obtained by dataset receiving unit 204 is communicated to mapping unit 206. The latter maps or converts any system-specific dataset into a corresponding global system-specific dataset, based on the common data model described with reference to FIG. 1.

Once the global system-specific datasets have been generated, merging unit 208 is activated to perform the merging. Merging unit 208 merges each of the global system-specific datasets to generate the merged global dataset according to the method described with reference to FIG. 1. The merging may be performed with support from logic unit 212. In various embodiments of the disclosure, logic unit 212 includes functions that merge the global system-specific datasets, using the set of rules described with reference to FIG. 1. Logic unit 212 may include, for example, instructions on selecting predetermined data from the global system-specific datasets. The predetermined data may then be included in the global dataset.

In an exemplary embodiment, logic unit 212 enables the selection of an attribute value of the physical asset from a plurality of system-specific datasets, based e.g. on a customized priority number. An attribute from a system-specific dataset with a higher priority number may be selected in preference to a system-specific dataset with a lower priority number. In another embodiment of the disclosure, logic unit 212 may enable the selection of the predetermined data by including a path to a running service such as a web service. The web service may, for example, take two attribute values from two global system-specific datasets as an input, and return the value that must be stored in the merged global dataset.

Figure 3:
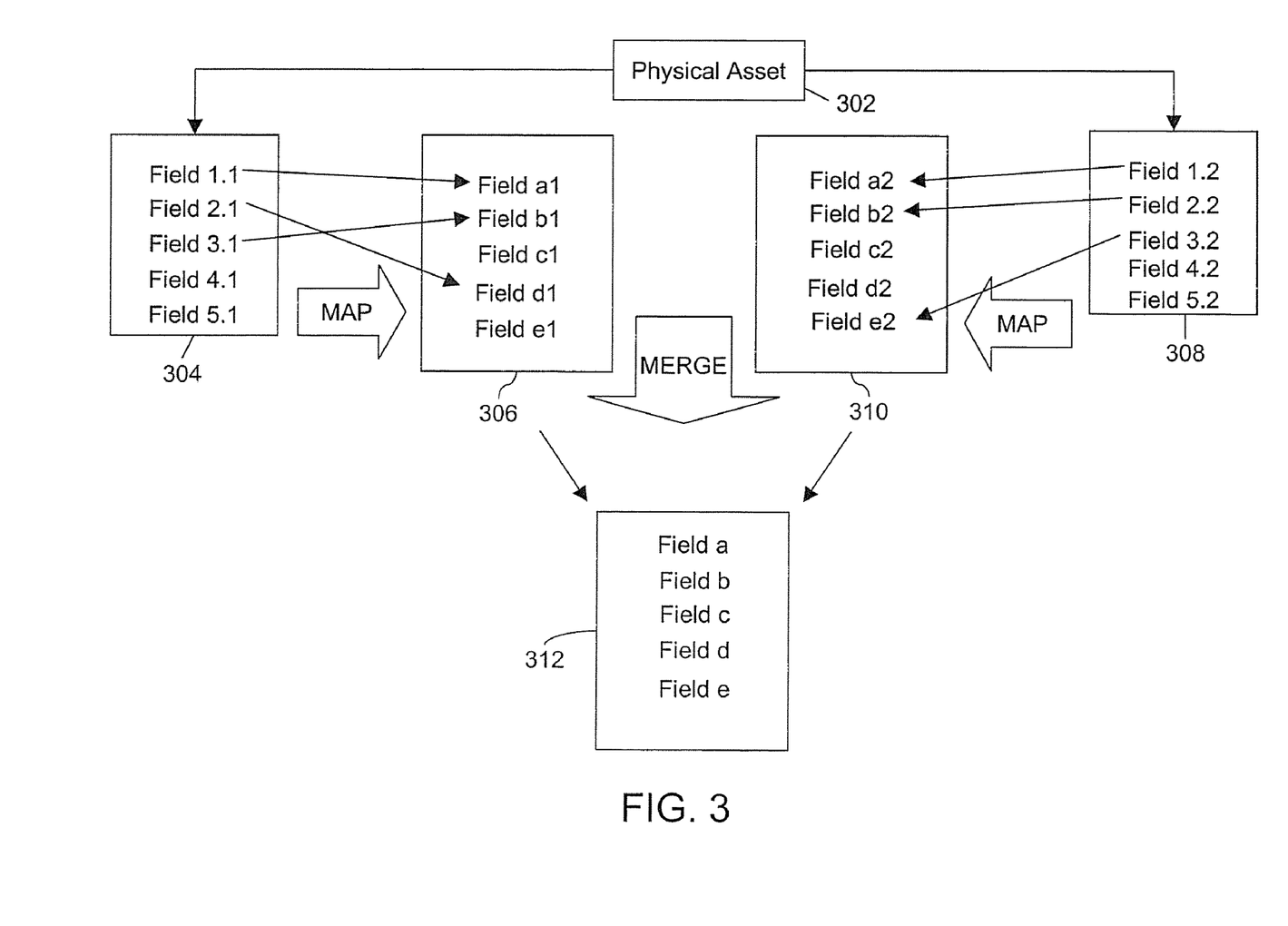
FIG. 3 depicts an exemplary schematic diagram of the outputs at each of the steps performed for the generation of the merged global dataset.

FIG. 3 depicts an exemplary schematic diagram of the outputs at each of the steps performed for the generation of the merged global dataset, according to an exemplary embodiment of the disclosure. Consider a transformer as an exemplary physical asset 302, for an explanation of the outputs.

A dataset 304 is an exemplary format of a system-specific dataset obtained from a first system. An exemplary first system can be a SCADA system. In various embodiments, system-specific dataset 304 includes five fields for attributes describing various properties of physical asset 302. The selected fields are then mapped to a dataset 306, which represents a corresponding global system-specific dataset. It should be noted, however, that not all the fields have to be mapped to global system-specific dataset 306, i.e. transformation may be limited to those selected fields that are required by the global data model. For example, Field 1.1 in dataset 304 is mapped to a field a1 in dataset 306, while a field 2.1 is mapped to a field d1 and a field 3.1 to a field b1. Additionally, fields 4.1 and 5.1 may not be mapped.

In another exemplary embodiment of the disclosure, a dataset 308 represents a second system-specific dataset. In an exemplary embodiment, the second system can be a CMMS system. As described before with reference to the mapping carried out for dataset 306, selected fields in system-specific dataset 308 are mapped to fields in dataset 310. Field 1.2 is mapped to a field a2, field 2.2 to a field b2, and field 3.2 to a field e2.

Subsequently, datasets 306 and 310 are merged to form a dataset 312 that represents an exemplary global dataset of the physical asset, according to the method described with reference to FIG. 1 and FIG. 2. Accordingly, dataset 312 includes fields obtained from global system-specific datasets 306 and 310. Potential conflicts due to non-matching data entries or inconsistent values in mutually corresponding data fields, e.g. in fields a1 and a2, are resolved by reverting to a set of rules as detailed below.

Figure 4:
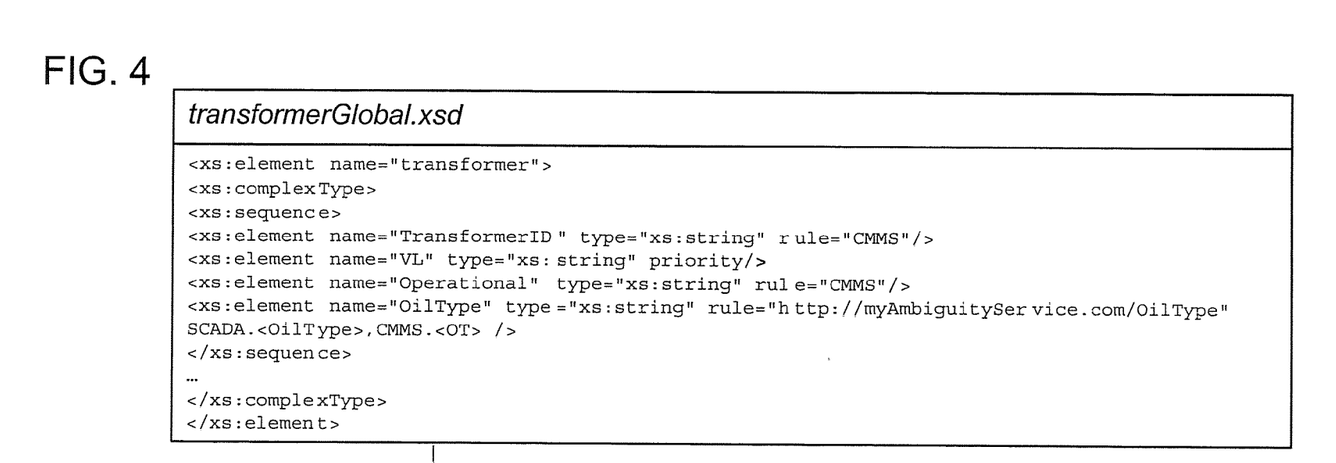
FIG. 4 depicts an exemplary global schema file describing a physical asset.

FIG. 4 depicts an exemplary global data type in the form of a schema file 402 describing physical asset 302, in accordance with an exemplary embodiment of the disclosure. The global schema file is referred to in the generation of the respective system-specific datasets. In various exemplary embodiments of the disclosure, the global schema file includes an embedded set of rules that is referred to during the step of data merging in case of conflicts or inconsistencies. For example, a rule may indicate from which one of the global system-specific datasets 306 and 310 the data is to be selected. To this purpose, an attribute of physical asset 302 in global schema file 402 may have an attached rule that specifies the system from which the value of a conflicting attribute prevails. An example of such a rule is specified e.g. on line 4 of FIG. 4: <xs:element name="TransformerID" type="xs: string" rule="CMMS"/>. This rule specifies that the ID of an exemplary physical transformer to be stored in the merged global dataset 312 is defined by, and accordingly retrieved from, the global CMMs-specific dataset 310.

In other exemplary embodiments of the disclosure, the embedded rules used for merging the global system-specific into a global dataset are based on priorities. This is the case for the attribute "voltage level" of physical asset 302 as indicated on line 5 of FIG. 4. As shown below in FIG. 5, schema files corresponding to different systems are assigned different priorities. For more complicated situations where the prevailing attribute value depends on further factors such as the latest service date, the exemplary global schema file 402 includes a function that sends the two competing attribute values to a running, preferably web-based, service. This is exemplified on line 7 of FIG. 4 by the URL http://myAmbiguityService.com/OilType followed by the attributes or parameters "OilType" and "OT" from two different systems SCADA and CMMS. Based on a logic function using the web service, a unambiguous value will be returned and finally stored in the merged global dataset 312.

Figure 5:
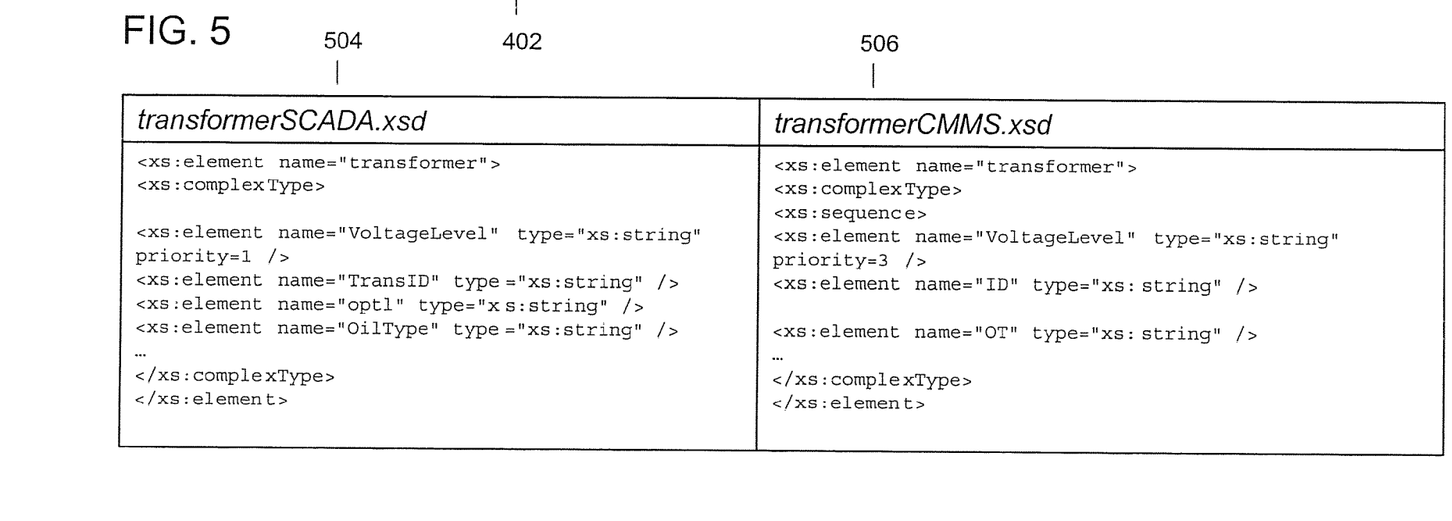
FIG. 5 shows schema files corresponding to a first system and a second system.

FIG. 5 shows two local data types in a SCADA-specific and a CMMS-specific XSD format corresponding to a first system and a second system. Schema file 504 (transformer-SCADA.xsd) and Schema file 506 (transformerCMMS.xsd) represent physical asset 302 by using reduced datasets and are generated by referring to the global schema file 402 (transformerglobal.xsd) in FIG. 4. The schema files 504 and 506 are associated with each other and with the global schema file 402 via a central service. For example, if a transformer identity is referred to as 'TransID' in the first system, and as 'ID' in the second system, a service offering functionalities such as that of central service unit 210 in FIG. 2 associates both 'TransID' and 'ID' with "TransformerID" in global schema file 402.

Figure 6:
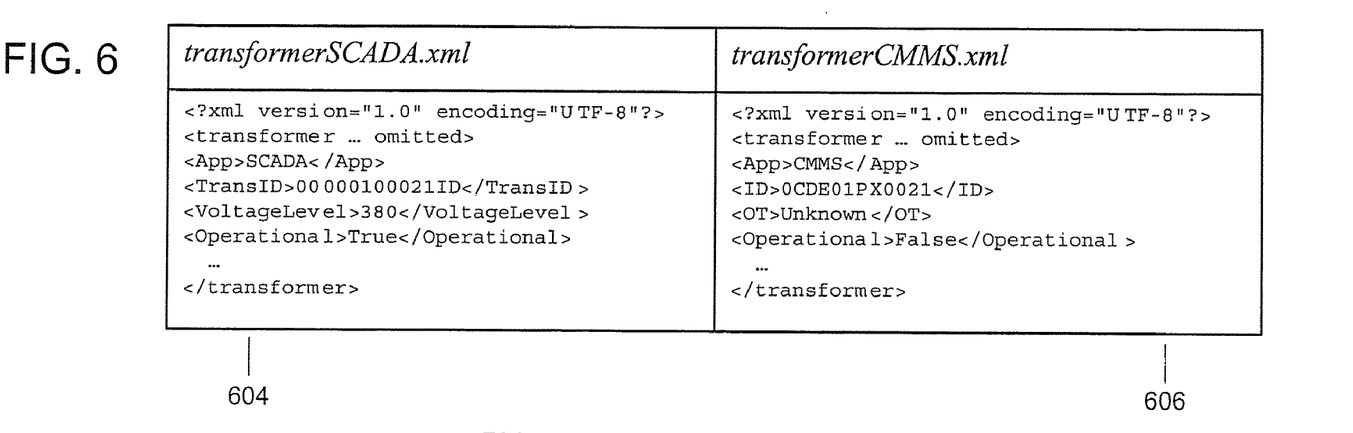
FIG. 6 depicts an exemplary file, showing the mapped datasets obtained from a first system and a second system.

FIG. 6 shows instances 604 (transformerSCADA.xml) and 606 (transformerCMMS.xml) generated based on the system-specific schema files 504 and 506 and assigned a corresponding system-specific dataset. As described with reference to FIG. 1, the data in instances 604 and 606 is in a text markup language format, which may be, for example, an XML format. In various embodiments, the XML format allows editing to be carried out on the datasets stored. It should be noted that the datasets represented in instances 604 and 606 have different structures and therefore cannot be directly compared or merged to generate the global dataset. Accordingly, the datasets in instances 604 and 606 are mapped to generate corresponding global system-specific datasets.

Figure 7:
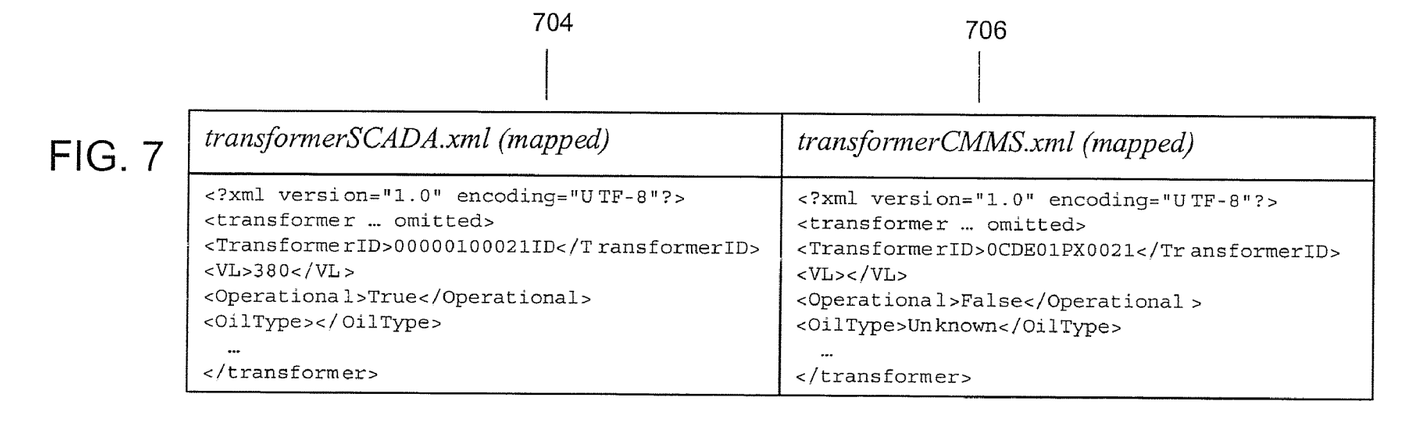
FIG. 7 depicts a file of the mapped datasets in the global data model.

FIG. 7 depicts these mapped datasets in the global data model format, according to an exemplary embodiment of the disclosure. The mapped datasets corresponding to the datasets in instances 604 and 606 are represented in files 704 and 706, respectively. The global data model therefore allows attributes of physical asset 302 to be represented in a standardized format across file 704 and file 706, and enables any operation, such as merging or swapping, to be performed. The mapping, according to the global data model, may be enabled by, for example, an Extensible Stylesheets Language Transformation (XSLT) transformation. The XSLT transformation allows the transformation of XML documents into other documents with a separate format.

Various exemplary embodiments of the disclosure provide an improved method of representing a physical asset. A unique representation of the physical asset may be generated from system-specific datasets obtained from corresponding supervisory systems that supervise the physical asset. A set of rules, to reduce any conflict in the representation of the respective supervisory systems, may be employed for the generation of the unique representation.

The systems and arrangements described herein may be embodied in the form of a software package that is positioned on a hardware to which it is interfaced via, for example, Programmable Logic Controllers (PLCs) or other commercial hardware modules. Such systems can run on operating systems such as a Diskette Operating System (DOS), a Virtual Memory System (VMS), UNIX Windows-NT and Linux.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

102 Step of mapping each system-specific data set into a global system-specific dataset
104 Step of merging each global system-specific data set into a global dataset
202 Global dataset generating system
204 Dataset Receiving Unit
206 Mapping Unit
208 Merging Unit
210 Central Service Unit
212 Logic Unit
302 Physical asset representation
304 File showing a system-specific dataset
306 File showing a global system-specific dataset
308 File showing a system-specific dataset
310 File showing a global system-specific dataset
312 File showing a global dataset
402 Global Schema file
504 System-specific schema file
506 System-specific schema file
604 Instance of scheme 504
606 Instance of scheme 506
704 File storing a mapped dataset using global data model
706 File storing a mapped dataset using global data model

What is claimed is:

1. A method of generating a unique representation of a physical asset from a plurality of system-specific datasets associated with a plurality of systems in an arrangement including a mapping unit and a merging unit, each system-specific dataset representing, in a system-specific data format, the physical asset and comprising system-specific information about the physical asset, the method comprising:

mapping, in the mapping unit, each of the system-specific datasets into a global system-specific dataset based on a global data model; and generating, in the merging unit, a global dataset by merging each of the global system-specific datasets into one global dataset based on the global data model wherein merging the global system-specific data sets includes selecting global data from amongst conflicting data of two or more global system-specific datasets and providing the conflicting data of the two or more global system-specific datasets to a running service, the global dataset uniquely representing the physical asset and comprising information about the physical asset from the plurality of systems, and wherein the merging is based on a set of rules.

2. The method according to claim 1, wherein the step of selecting global data comprises using a logic function.

3. A system for generating a unique representation of a physical asset from a plurality of system-specific datasets associated with a plurality of systems, each system-specific dataset representing, in a system-specific data format, the physical asset and comprising system-specific information about the physical asset, the arrangement comprising:

means for mapping each of the system-specific datasets into a global system-specific dataset based on a global data model; and means for generating a global dataset by merging each of the global system-specific datasets into one global dataset based on the global data model, the global dataset uniquely representing the physical asset and comprising information about the physical asset from the plurality of systems, wherein the merging is based on a set of rules, wherein the means for generating the global dataset comprises a running service to which the conflicting data of the two or more global system-specific datasets are provided.

4. The system according to claim 3, wherein the physical asset is a device of a power utility.

5. The system according to claim 3, wherein at least the global data model is a text mark up language format.

6. The system according to claim 3, generating the global dataset comprises a logic function for selecting global data from amongst conflicting data of two or more global system-specific datasets.

* * * * *